US007952580B1

(12) United States Patent
Yhann et al.

(10) Patent No.: US 7,952,580 B1
(45) Date of Patent: May 31, 2011

(54) CLASSIFICATION OF EXTERIOR AND INTERIOR TRIANGLES FOR ARTWORK RENDERING

(75) Inventors: Stephan R. Yhann, Renton, WA (US); Prasun Choudhury, Sunnyvale, CA (US)

(73) Assignee: Adobe Systems Incorporated, San Jose ( * ) Notice: Subject to any disclaimer, the term of this patent is extended or adjusted under 35 U.S.C. 154(b) by 942 days.

(21) Appl. No.: 11/848,950

(22) Filed: Aug. 31, 2007

(51) Int. Cl.
*G06T 15/00* (2011.01)

(52) U.S. Cl. ........ 345/423; 345/419; 345/420; 345/502; 345/619

(58) Field of Classification Search .................. 345/419, 345/420, 423, 502, 619
See application file for complete search history.

(56) References Cited

U.S. PATENT DOCUMENTS

| | | | | |
|---|---|---|---|---|
| 5,377,320 | A * | 12/1994 | Abi-Ezzi et al. | 345/502 |
| 6,100,894 | A * | 8/2000 | Goel | 345/423 |
| 6,295,072 | B1 | 9/2001 | Pan et al. | |
| 6,954,211 | B2 | 10/2005 | Michail et al. | |
| 7,050,067 | B2 | 5/2006 | Raubacher et al. | |
| 7,116,327 | B2 | 10/2006 | Katka | |
| 7,127,525 | B2 | 10/2006 | Coleman et al. | |
| 7,142,206 | B1 * | 11/2006 | Moreton | 345/419 |
| 7,212,205 | B2 * | 5/2007 | Uesaki et al. | 345/423 |
| 7,239,319 | B2 | 7/2007 | Loop | |
| 7,250,946 | B1 * | 7/2007 | Moreton | 345/420 |
| 7,295,202 | B2 * | 11/2007 | Harada et al. | 345/420 |
| 7,385,612 | B1 * | 6/2008 | Peterson | 345/619 |
| 7,768,511 | B2 * | 8/2010 | Fenney | 345/423 |
| 2007/0097123 | A1 | 5/2007 | Loop et al. | |

FOREIGN PATENT DOCUMENTS

EP 1630745 1/2006

OTHER PUBLICATIONS

John D. Hobby, "Rasterization of Nonparametric Curves," ACM Transactions on Graphics, Jul. 1990, pp. 262-277, vol. 9, Issue 3, ACM Press, New York, NY.
Fiaz Hussain and Michael L.V. Pitteway, "Rasterizing the Outlines of Fonts," Electronic Publishing, Sep. 1993, pp. 171-181, vol. 6, No. 3.
Zheng Qin, Michael D. McCool, and Craig S. Kaplan, "Real-Time Texture-Mapped Vector Glyphs," Symposium on Interactive 3D Graphics, 2006, pp. 125-132, ACM Press, New York, NY.

(Continued)

*Primary Examiner* — Phu Nguyen
(74) *Attorney, Agent, or Firm* — Robert C. Kowert; Meyertons, Hood, Kivlin, Kowert & Goetzel, P.C.

(57) ABSTRACT

A method, system, and computer-readable storage medium are disclosed for rendering a path with classification of triangles as external and internal. In one embodiment, a tessellation based on the path may be generated, wherein the tessellation comprises a plurality of triangles. A first subset of the plurality of triangles may be determined to comprise one or more exterior triangles, wherein each of the one or more exterior triangles contains a respective curve. For each triangle of the one or more exterior triangles, a side of the curve to be rendered may be determined. A second subset of the plurality of triangles may be determined to comprise one or more interior triangles. The exterior triangles and the interior triangles may be rendered using a graphics processing unit, wherein each of the exterior triangles is rendered based on the respective side of the curve determined to be rendered.

18 Claims, 9 Drawing Sheets

OTHER PUBLICATIONS

Seth J. Teller and Carlo H. Sequin, "Modeling Implicit Quadrics and Free-form Surfaces With Trimmed Rational Quadratic Bezier Patches," Technical Report No. UCB/CSD-90-577, Jun. 1990, University of California-Berkeley.

Bala R. Vatti, "A Generic Solution to Polygon Clipping," Communications of the ACM, Jul. 1992, pp. 56-63, vol. 35, Issue 7, ACM Press, New York, NY.

Eric Chan, "Fast Antialiasing Using Prefiltered Lines on Graphics Hardware," Feb. 2004, http://people.csail.mit.edu/ericchan/articles/prefilter/.

Charles Loop and Jim Blinn, "Resolution Independent Curve Rendering Using Programmable Graphics Hardware," ACM SIGGRAPH 2005, 2005, pp. 1000-1009, ACM Press, New York, NY.

Raimund Seidel, "A Simple and Fast Incremental Randomized Algorithm for Computing Trapezoidal Decompositions and for Triangulating Polygons," Computional Geometry: Theory and Applications, Jul. 1991, pp. 51-64, vol. 1, No. 1, Elsevier Science Publishers B.V., Amsterdam.

\* cited by examiner

Interior Polygon 700

Exterior Curves (and Original Boundary) 800

CLASSIFICATION OF EXTERIOR AND INTERIOR TRIANGLES FOR ARTWORK RENDERING

BACKGROUND

1. Field of the Invention

The present invention is directed to computer systems; and more particularly, it is directed to the rendering of artwork using computer systems.

2. Description of the Related Art

As the power and complexity of personal computer systems increase, graphics operations are increasingly being performed using dedicated graphics rendering devices referred to as graphics processing units (GPUs). As used herein, the terms "graphics processing unit" and "graphics processor" are used interchangeably. GPUs are often used in removable graphics cards that are coupled to a motherboard via a standardized bus (e.g., AGP or PCI Express). GPUs may also be used in game consoles and in integrated graphics solutions (e.g., for use in some portable computers and lower-cost desktop computers). Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may implement one or more application programmer interfaces (APIs) that permit programmers to invoke the functionality of the GPU.

A GPU may include various built-in and configurable structures for rendering digital images to an imaging device. Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values.

Vector graphics data may be stored and manipulated as one or more geometric objects built with geometric primitives. The geometric primitives (e.g., points, lines, polygons, Bézier curves, and text characters) may be based upon mathematical equations to represent parts of vector graphics data in digital images. The geometric objects may typically be located in two-dimensional or three-dimensional space. To render vector graphics on raster-based imaging devices (e.g., most display devices and printers), the geometric objects are typically converted to raster graphics data in a process called rasterization.

Graphical data may often be expressed in a structured format that complies with a particular specification or model for representing such data. Instead of requiring application programs to describe every page as a full-resolution pixel array, a high-level imaging model may enable applications to describe the appearance of pages containing text, graphical shapes, and sampled images in terms of abstract graphical elements rather than directly in terms of device pixels. Such specifications and models may often be implemented across multiple computing platforms to facilitate the exchange of graphical data. The Adobe® PostScript® language, Adobe® Portable Document Format, and Adobe® Imaging Model, for example, include various structures and commands to describe complex two-dimensional graphical data including both geometric (i.e., vector-based) and bitmapped elements.

The geometric elements may include paths, and each path may include line segments and/or curves. Paths may be used to represent characters in a font.

A current approach to rendering a curve is to "flatten" the curve by breaking it into a series of concatenated line segments that approximate the shape of the original curve. Using this procedure, every path in the artwork may be represented as a polygon with straight edges. The polygon may then be tessellated using conventional tessellation algorithms to generate a set of triangles that will be sent to the GPU. However, the number of triangles sent to the GPU will depend on the flattening procedure, i.e., on the number of straight line segments used to approximate the curve at a particular resolution.

SUMMARY

Various embodiments of systems, methods, and computer-readable storage media for rendering a path with classification of triangles as external and internal are disclosed. In one embodiment, a tessellation may be generated based on a path. The tessellation may comprise a plurality of triangles. A first subset of the plurality of triangles may be determined to comprise one or more exterior triangles. Each of the one or more exterior triangles may contain a respective curve. For example, a quadratic Bézier curve may be contained within one exterior triangle, and a cubic Bézier curve may be contained within two exterior triangles. For each of the exterior triangles, a side of the curve to be rendered may be determined. The side of the curve (e.g., above or below the curve) may be determined based on the orientation of the curve in relation to the orientation of the path. In this manner, each of the exterior triangles may be designated as concave or convex relative to the path.

In one embodiment, a second subset of the plurality of triangles may be determined to comprise one or more interior triangles. An interior polygon may comprise the interior triangles. A host system may send to a graphics processing unit (GPU) the exterior triangles, the interior triangles, and a designation of the side of the curve to be rendered for each exterior triangle. The exterior triangles and the interior triangles may be rendered using (i.e., on) a GPU, and each of the exterior triangles may be rendered based on the side of the curve previously determined to be rendered. In one embodiment, fewer triangles may be sent to the GPU than using the conventional "flattening" technique for curves. Therefore, the artwork may be rendered in the GPU with fewer operations, and bandwidth between the host system and the GPU may be conserved.

Figure 1:
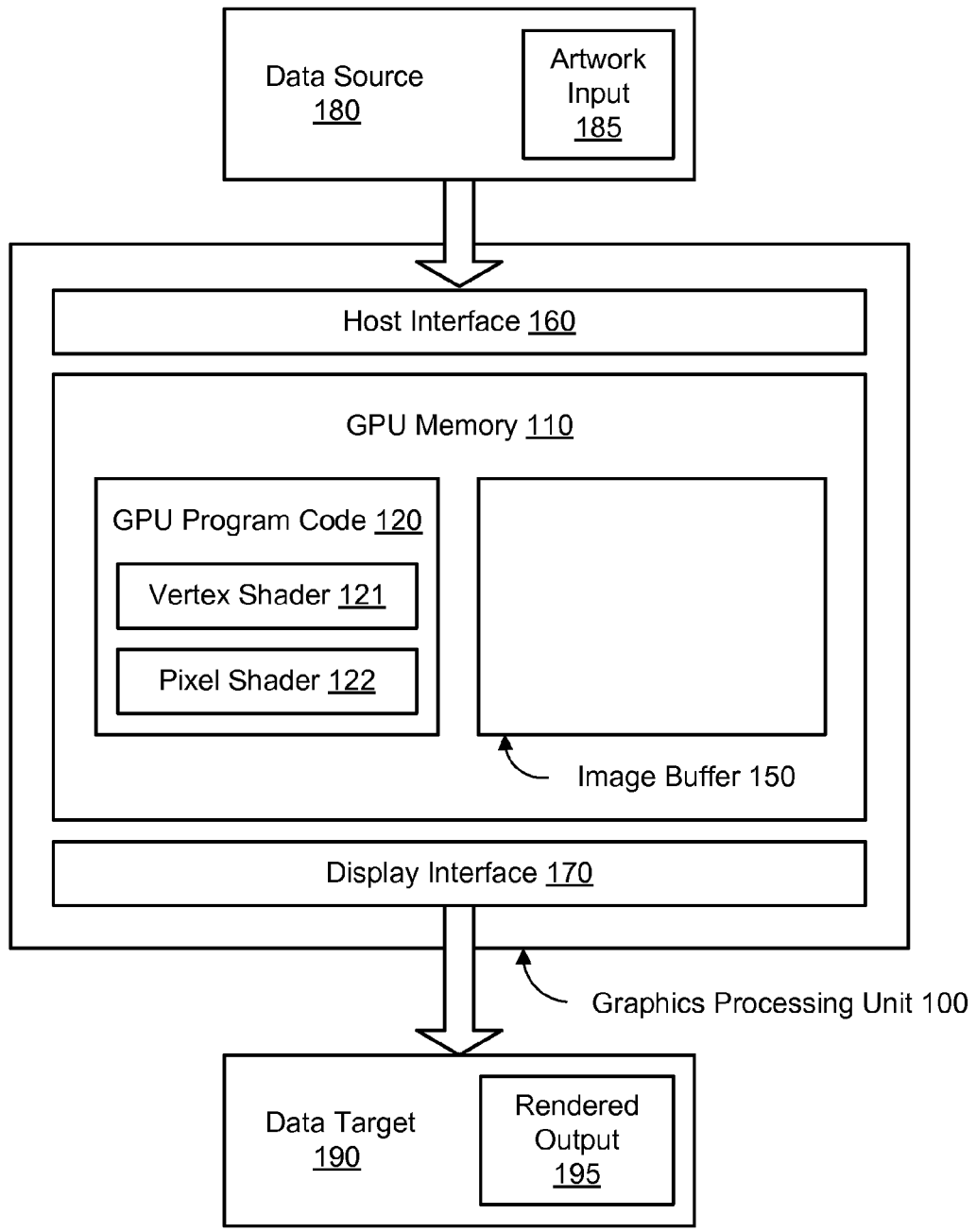
FIG. 1 is a block diagram illustrating one embodiment of a graphics processing unit (GPU) configured for rendering artwork with triangles classified as exterior and interior.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 9:
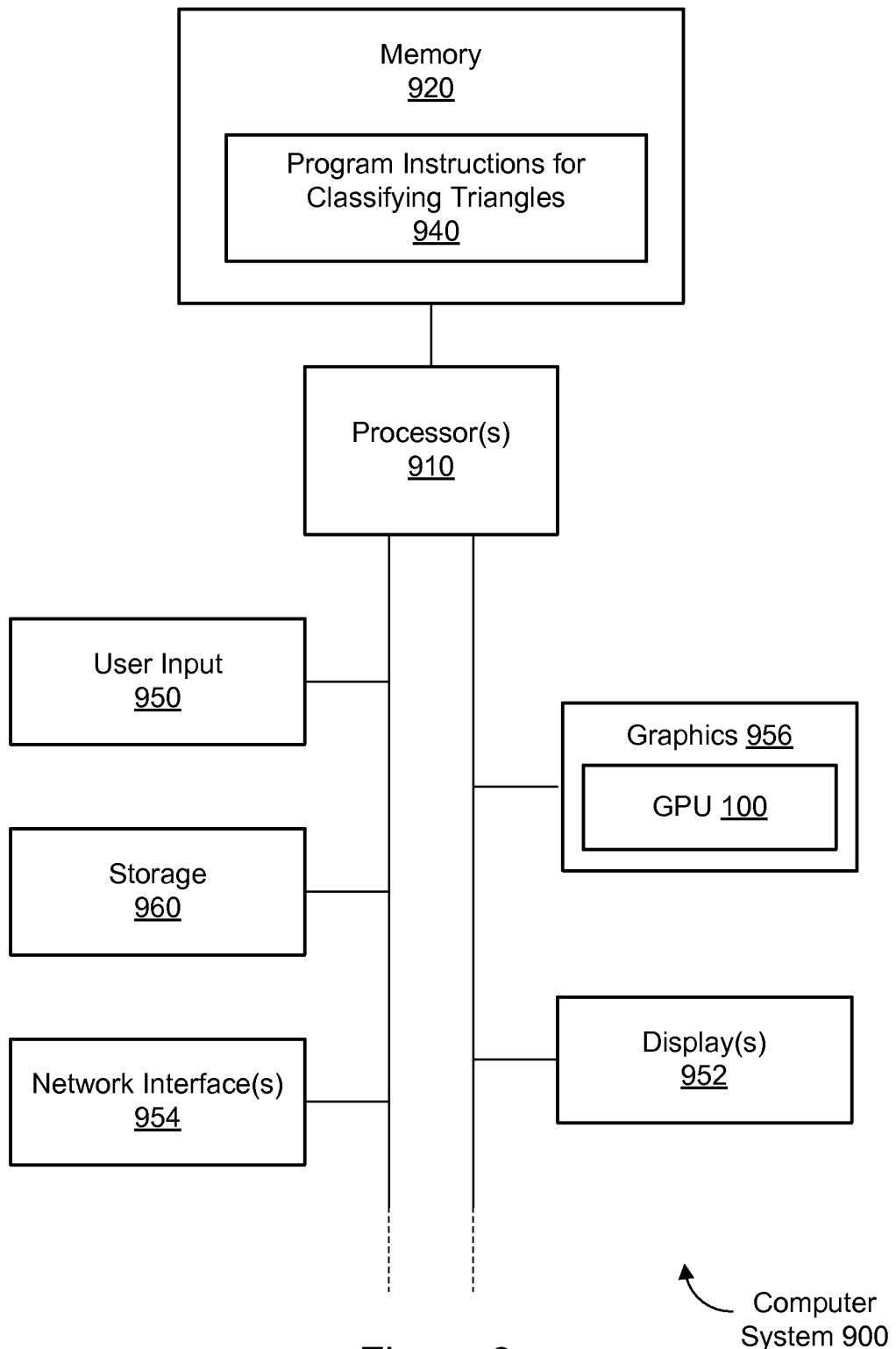
FIG. 9 is a block diagram illustrating constituent elements of a computer system that is configured to implement embodiments of the system and method for rendering artwork with triangles classified as exterior and interior.

Using embodiments of the systems and methods described herein, triangles in an artwork may be classified as exterior triangles and interior triangles for efficient rendering. In one embodiment, the artwork including the classified triangles may be rendered using a GPU (i.e., in the GPU). FIG. 1 is a block diagram illustrating one embodiment of a graphics processing unit (GPU) configured for rendering artwork with triangles classified as exterior and interior. The GPU 100, also referred to herein as a graphics processor, may comprise a dedicated graphics rendering device associated with a computer system. An example of a suitable computer system 900 for use with a GPU is illustrated in FIG. 9. Turning back to FIG. 1, the GPU 100 may include numerous specialized components configured to optimize the speed of rendering graphics output. For example, the GPU 100 may include specialized components for rendering three-dimensional models, for applying textures to surfaces, etc. For the sake of illustration, however, only a limited selection of components is shown in the example GPU 100 of FIG. 1. It is contemplated that GPU architectures other than the example architecture of FIG. 1 may be suitable for implementing the techniques described herein. The GPU 100 may implement one or more application programmer interfaces (APIs) that permit programmers to invoke the functionality of the GPU. Suitable GPUs may be commercially available from vendors such as NVIDIA Corporation, ATI Technologies, and others.

The GPU 100 may include a host interface 160 configured to communicate with a data source 180 (e.g., a communications bus and/or processor(s) 910 of a host computer system 900, or the host system itself). For example, the data source 180 may provide input data (e.g., artwork comprising one or more geometric objects) and/or executable program code to the GPU 100. In some embodiments, the host interface 160 may permit the movement of data in both directions between the GPU 100 and the data source 180. The GPU 100 may also include a display interface 170 for providing output data to a data target 190. For example, the data target 190 may comprise a display device 952, and the GPU 100 (along with other graphics components and/or interfaces 956) may "drive" the display 952 by providing graphics data at a particular rate from a screen buffer (e.g., the image buffer 150).

In one embodiment, the GPU 100 may include internal memory 110. The GPU memory 110, also referred to herein as "video memory" or "VRAM," may comprise random-access memory (RAM) which is accessible to other GPU components. As will be described in greater detail below, the GPU memory 110 may be used in some embodiments to store various types of data and instructions such as input data, output data, intermediate data, program instructions for performing various tasks, etc. In one embodiment, the GPU 100 may also be configured to access memory 920 of a host computer system 900 via the host interface 160. In one embodiment, program instructions 940 may be stored in the memory 920 of the host computer system 900 and executed by the host computer system 900 to generate rendered output 195 based on artwork input 185.

In one embodiment, the GPU 100 may include GPU program code 120 that is executable by the GPU 100 to perform aspects of the techniques discussed herein. For example, the regions defined by the paths in the path input 185 may be rasterized to pixels during a rendering process including execution of the GPU program code 120 on the GPU 100. Elements of the GPU program code 120 may be provided to the GPU 100 by a host computer system (e.g., the data source 180) and/or native to the GPU 100. In one embodiment, the GPU program code 120 may comprise a vertex shader 121. A vertex shader 121 comprises program instructions that are executable by the GPU 100 to determine properties (e.g., position) of a particular vertex. A vertex shader 121 may expect input such as uniform variables (e.g., constant values for each invocation of the vertex shader) and vertex attributes (e.g., per-vertex data). In one embodiment, the GPU program code 120 may comprise a pixel shader 122. A pixel shader 122 comprises program instructions that are executable by the GPU 100 to determine properties (e.g., color) of a particular pixel. A pixel shader 122 may also be referred to as a fragment shader. A pixel shader 122 may expect input such as uniform variables (e.g., constant values for each invocation of the pixel shader) and pixel attributes (e.g., per-pixel data). In generating the rendered output 195, both the vertex shader 121 and the pixel shader 122 may be executed at various points in the graphics pipeline.

The GPU memory 100 may comprise one or more buffers, and each buffer may comprise a two-dimensional array of pixel data (e.g., color values) and/or pixel metadata (e.g., depth values, stencil values, etc.). As illustrated in FIG. 1, for example, the GPU memory 110 may comprise an image buffer 150. The image buffer 150 may store intermediate or final pixel values generated in the rendering process. In one embodiment, the image buffer 150 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In one embodiment, the image buffer 150 may comprise a multi-sampling buffer usable for anti-aliasing.

The artwork input 185 may comprise one or more paths. A path may comprise a series of one or more straight lines, one or more quadratic Bézier curves, and/or one or more cubic Bézier curves. In an embodiment in which the Adobe® Imaging Model is employed, the straight lines may be defined by "lineto" operations, and the Bézier curve may be defined by "curveto" operations. A quadratic Bézier curve is a parametric curve defined by three points ($P_0$, $P_1$, $P_2$) in a plane or in three-dimensional space. The quadratic Bézier curve starts at $P_0$ and ends at $P_2$; the quadratic Bézier curve is influenced by the position of the control points $P_1$ relative to the endpoints $P_0$ and $P_2$. Similarly, a cubic Bézier curve is a parametric curve defined by four points ($P_0$, $P_1$, $P_2$, $P_3$) in a plane or in three-dimensional space. The cubic Bézier curve starts at $P_0$ and ends at $P_3$; the cubic Bézier curve is influenced by the position of the control points $P_1$ and $P_2$ relative to the endpoints $P_0$ and $P_3$.

Each path in the artwork 185 may be closed by joining the first and the last points of the path. To render the artwork 185 on GPU 100, each path may be tessellated to create a plurality of triangles which are transmitted to the GPU 100. The term "tessellation" may refer to a collection of non-overlapping triangles that cover a region (e.g., a region enclosed by a path). The term "tessellation" may also refer to the process of generating such a set of triangles given a set of geometric objects (e.g., paths) as input. In one embodiment, the paths in the artwork input 185 may be tessellated (i.e., reduced to triangles) prior to sending the artwork input 185 to the GPU 100. For example, the tessellation may occur through tessellation techniques performed on the data source 180. The artwork input 185 may comprise the set of triangles resulting from the tessellation process. As will be described in greater detail below, the triangles may be classified as "exterior" and "interior" triangles for efficient rendering in the GPU 100. In one embodiment, fewer triangles may be sent to the GPU 100 than using the conventional "flattening" technique for curves. Therefore, the artwork may be rendered in the GPU 100 with fewer operations, and bandwidth between the host system and the GPU 100 may be conserved.

Figure 2:
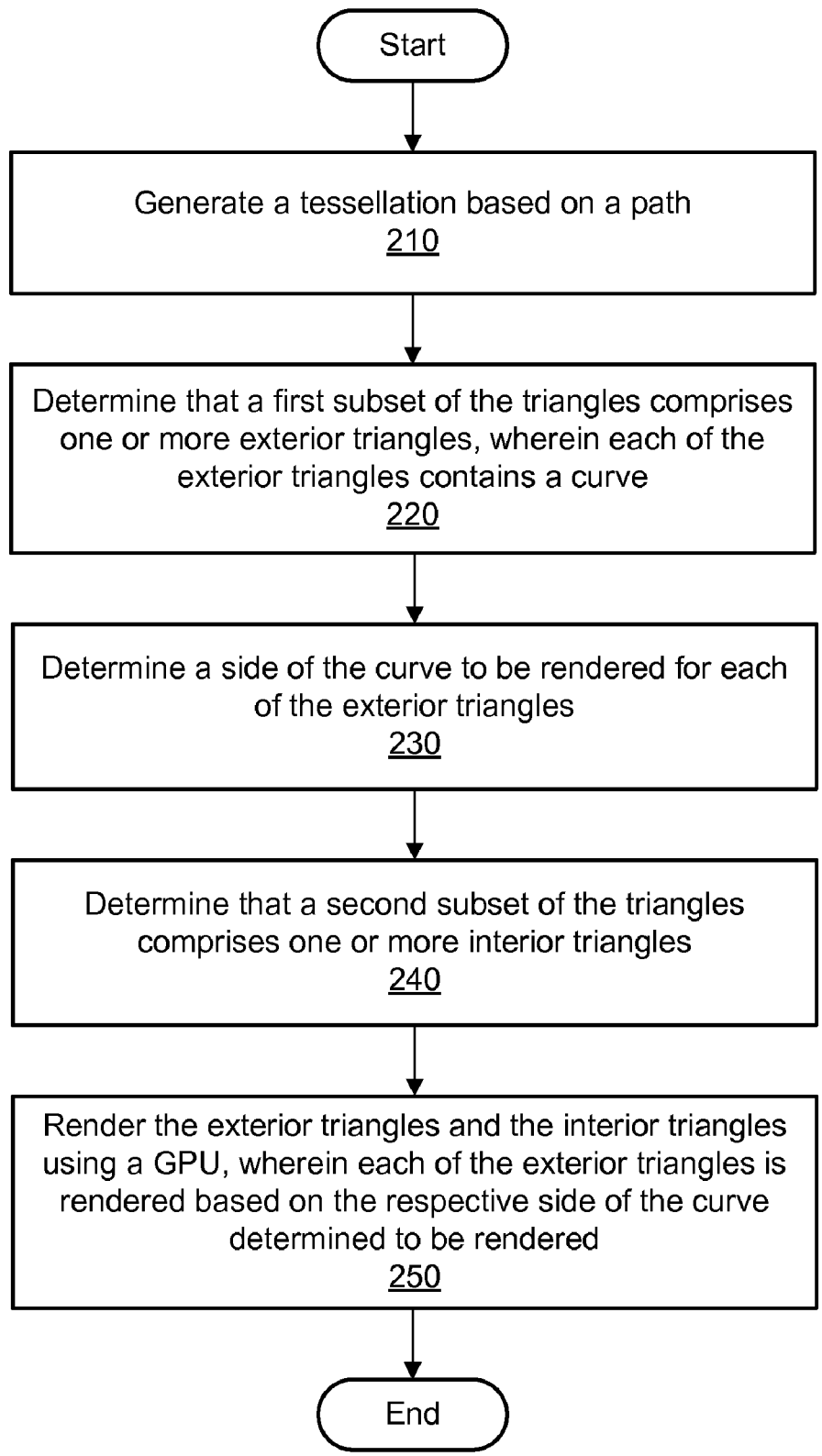
FIG. 2 is a flow diagram illustrating a method for rendering artwork with triangles classified as exterior and interior according to one embodiment.

FIG. 2 is a flow diagram illustrating a method for rendering artwork with triangles classified as exterior and interior according to one embodiment. As shown in block 210, a tessellation may be generated based on a path. The tessellation may comprise a plurality of triangles.

As shown in block 220, a first subset of the plurality of triangles may be determined to comprise one or more exterior triangles. Each of the one or more exterior triangles may contain a respective curve. As shown in block 230, a side of the curve to be rendered may be determined for each respective triangle of the one or more exterior triangles. The side of the curve (e.g., above or below the curve) may be determined based on the orientation of the curve in relation to the orientation of the path. In this manner, each of the exterior triangles may be designated as concave or convex.

As shown in block 240, a second subset of the plurality of triangles may be determined to comprise one or more interior triangles. An interior polygon may comprise the interior triangles. The host system may send to the GPU 100 the exterior triangles, the interior triangles, and a designation of the side of the curve to be rendered for each exterior triangle. As shown in block 250, the exterior triangles and the interior triangles may be rendered using (i.e., on) a GPU, and each of the exterior triangles may be rendered based on the side of the curve determined to be rendered in block 230.

In one embodiment, a path that self-intersects or has internal holes may be planarized prior to using the triangle classification technique. Planarization may produce a planar path (e.g., a path that is non-self-intersecting and "simple"). Conventional techniques for planarizing a path may be used.

Figure 3:
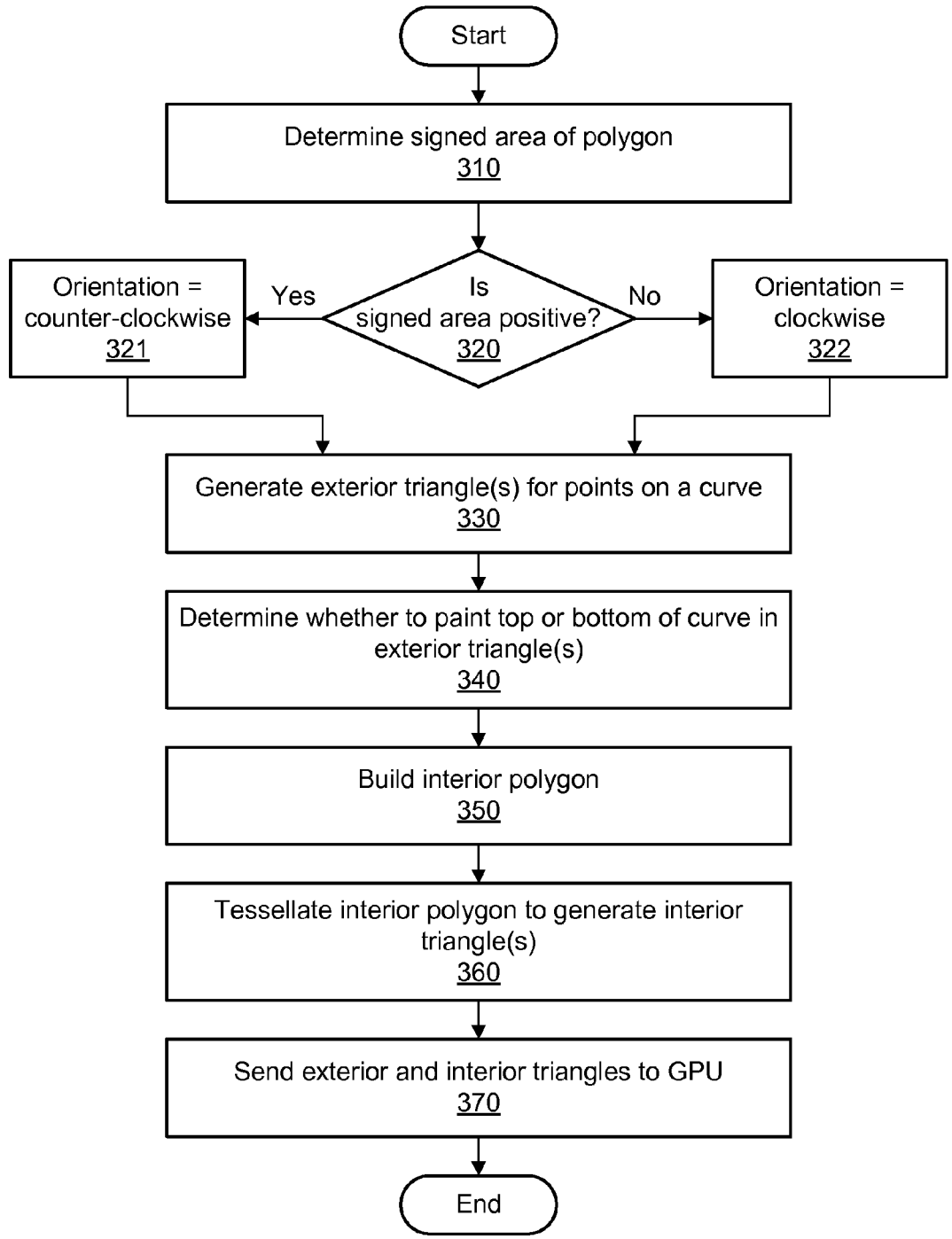
FIG. 3 is a flow diagram illustrating further aspects of a method for rendering artwork with triangles classified as exterior and interior according to one embodiment.

FIG. 3 is a flow diagram illustrating further aspects of a method for rendering artwork with triangles classified as exterior and interior according to one embodiment. Before the tessellation is sent to the GPU 100, each path in the artwork 185 may be traversed to classify each triangle encountered as "exterior" or "interior." In one embodiment, two passes through each path may be used to classify all the triangles in the path.

In the first pass, the orientation of the path may be determined in a first pass. The orientation of the path may represent whether the path is wound in the clockwise or counter-clockwise direction. To determine the orientation, all the points of the path may be sequentially traversed. In one embodiment, the points in the path may be stored in a sequence, and traversal of the path may begin with the first point. In one embodiment, as shown in block 310, the signed area of the closed polygon corresponding to the path may be computed during traversal of the points in the path. The signed area may be determined using conventional techniques. For example, for a polygon with n vertices, with each vertex $v_i$ having coordinates $x_i$ and $y_i$, then twice the signed area A of the polygon may be calculated as:

$$2A = \sum_{i=0}^{n-1} (x_i y_{i+1} - x_{i+1} y_i)$$

Based on the signed area of the closed polygon, a clockwise or counter-clockwise direction may be assigned to the path. As shown in blocks 320 and 321, the orientation of the path may be assigned as being counter-clockwise if the signed area is positive. As shown in blocks 320 and 322, the orientation of the path may be assigned as being clockwise if the signed area is negative.

In one embodiment, if the path is known to be normalized, the orientation of the path may not be determined by traversing the path as shown in blocks 310, 320, 321, and 322. The path may be known to be normalized, for example, if it is a normalized font outline or if has been put into a specified orientation (e.g., by planarizing it).

In the second pass, the orientation of every triangle in the path may be determined in relation to the path itself. The triangles corresponding to the curves may be marked as exterior triangles, and the remaining triangles may be marked as interior triangles. Based on the orientation of the input path and the orientation of the curves in the exterior triangles relative to the path, it may be determined whether the region above or below the curve for the exterior triangles is painted. An orientation check may be bypassed for the interior triangles, which may be flat shaded (i.e., in a uniform color) using a fill operation. Again, all the points of the path may be sequentially traversed (e.g., beginning from a first point as stored in the artwork). In one embodiment, the second pass through all the points in the path may be performed using one or more of the operations shown in blocks 330, 340, 350, 360, and 370.

As shown in block 330, if the point is part of a curve (e.g., corresponding to a "curveto" operation in the Adobe® Imaging Model), then the related one or more triangles may be generated and classified as one or more "exterior" triangles. For a quadratic Bézier curve, one triangle may be generated and classified as exterior. The three vertices of the triangle may be the three control points of the quadratic Bézier curve. For a cubic Bézier curve, two triangles may be generated and classified as exterior.

Figure 4:
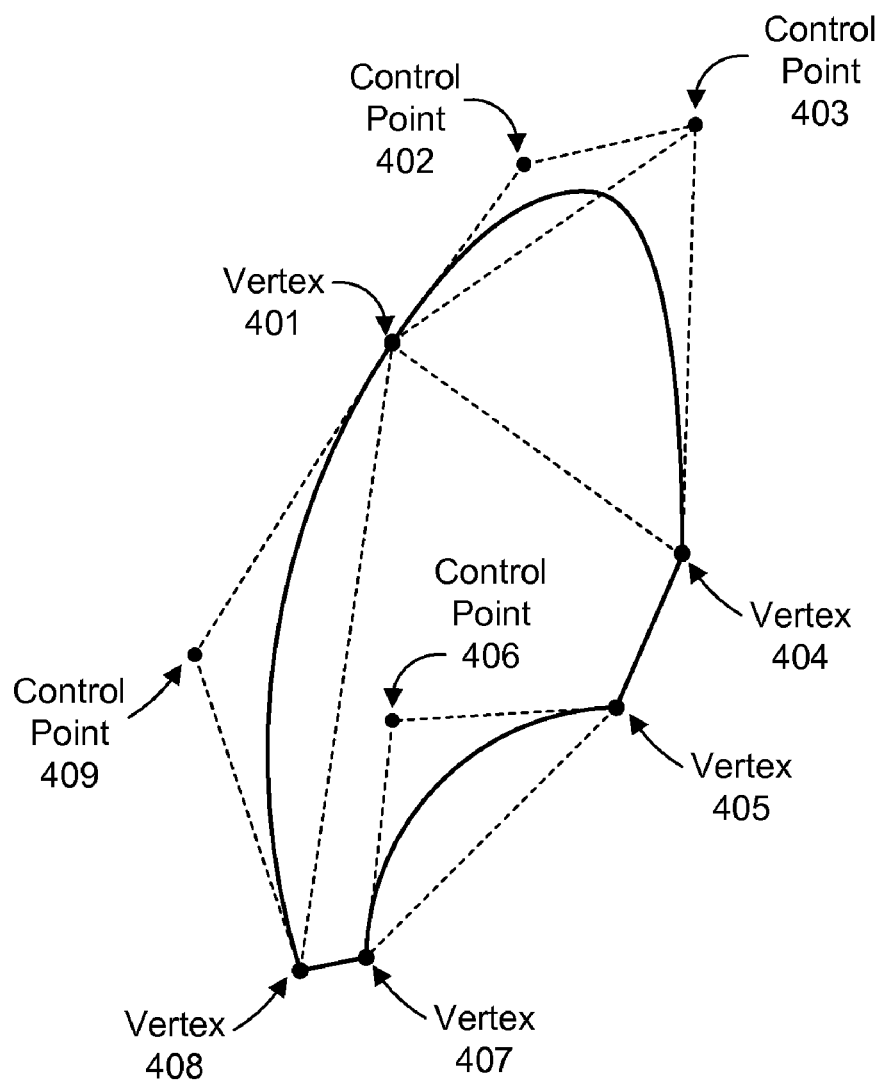
FIG. 4 is a diagram illustrating an example of curves and corresponding triangles in a path according to one embodiment.

FIG. 4 is a diagram illustrating an example of curves and their corresponding triangles in a path according to one embodiment. An example path includes vertices 401, 404, 405, 407, and 408. Vertices 405 and 407 are endpoints of a quadratic Bézier curve that also includes an off-curve control point 406. Vertices 408 and 401 are endpoints of a quadratic Bézier curve that also includes an off-curve control point 409. Each of the quadratic Bézier curves is contained within a triangle defined by its two endpoints and its additional control points.

Vertices 401 and 404 are endpoints of a cubic Bézier curve that also includes off-curve control points 402 and 403. The cubic Bézier curve is contained within a quadrilateral whose corners are the two endpoints 401 and 404 and the two additional control points 402 and 403. In one embodiment, the cubic Bézier curve may be passed to the GPU as two triangles: a first triangle with vertices 401, 402, and 403, and a second triangle with vertices 401, 403, and 404. In one embodiment, the cubic Bézier curve may be decomposed using conventional techniques into two or more quadratic Bézier curves that approximate the cubic Bézier curve. The resulting quadratic curves may then be contained within triangles. For example, a first quadratic curve may be contained within a triangle defined by vertex 401, control point 402, and the midpoint of the original cubic Bézier curve. A second quadratic curve may be contained within a triangle defined by vertex 404, control point 403, and the midpoint of the original cubic Bézier curve. All of the triangles encompassing Bézier curves may be classified as exterior triangles.

Turning back to FIG. 3, as shown in block 340, the orientation of the triangle relative to the path may be determined, and a decision to paint the top or bottom region of the curve in the exterior triangle may result. In one embodiment, the orientation of the curve with respect to the path is either concave or convex. In FIG. 4, for example, the curve having endpoints 405 and 407 is concave, and the curve having endpoints 408 and 401 is convex. If the curve is concave, then the off-curve control points of the curve are to the inside of the line connecting the first and last control points of the curve. If the curve is convex, then the off-curve control points are to the outside of the line connecting the first and last control points of the curve. "Insidedness" and "outsidedness" may be determined using a standard "left-of" rule defined by the winding orientation of the path. In one embodiment, concave triangles may paint the region in the triangle above the curve, and the off-curve control points (e.g., control point 406) are in the object and are added as part of the interior polygon so that all of the control points of the curve (e.g., points 405, 406, and 407) are included as line segments on the interior polygon. In one embodiment, convex triangles may paint the region below the curve, and the off-curve control points (e.g., control point 409) are not in the object so that only the first and last control points (e.g., endpoints 408 and 401) are on the interior polygon. Therefore, for the quadratic curve with endpoints 401 and 408, the region to the right of the curve may be rendered in the GPU. For the quadratic curve with endpoints 405 and 407, the region to the left of the curve may be rendered in the GPU. For the cubic curve with endpoints 401 and 404, the region below the curve may be rendered in the GPU.

As shown in block 350, a list of the points corresponding to the interior polygon may be maintained while traversing the path. In one embodiment, the interior polygon is a sequence of connected line segments. The interior polygon may include points from line segments in the original path as well as control points added to the polygon as described with respect to block 340. In the example shown in FIG. 4, the interior polygon may include points 401, 404, 405, 406, 407, and 408.

As shown in block 360, the interior polygon may be tessellated to generate one or more interior triangles. The tessellation may be performed using conventional techniques. For example, if the interior polygon is simple, non-intersecting, and without any holes, then the interior polygon may be triangulated using an algorithm described in "A Simple and Fast Incremental Randomized Algorithm for Computing Trapezoidal Decompositions and for Triangulating Polygons" by Raimund Seidel (*Computational Geometry: Theory and Application*, vol. 1, no. 1, pp. 51-64, Elsevier Science Publishers B. V., Amsterdam, 1991).

As shown in block 370, the interior triangles and exterior triangles may be sent to the GPU 100 for rendering. The rendering process inside the GPU 100 may proceed using conventional techniques for rasterizing the triangles to generate the rendered output 195. The interior triangles may be rendered as constant colored triangles. The exterior triangles may be rendered as triangles with curves in them such that either the region above or below the curve is painted (as determined in block 340). In one embodiment, the exterior triangles and interior triangles may be sent to the GPU 100 in a single batch after all the triangles have been generated and classified. In another embodiment, the triangles may be sent in smaller increments (e.g., the interior triangles may be sent separately from the exterior triangles). In one embodiment, the triangles in only one path may be sent in a single batch to the GPU 100. In another embodiment, the triangles in a plurality of paths may be batched to the GPU 100.

Figure 5:
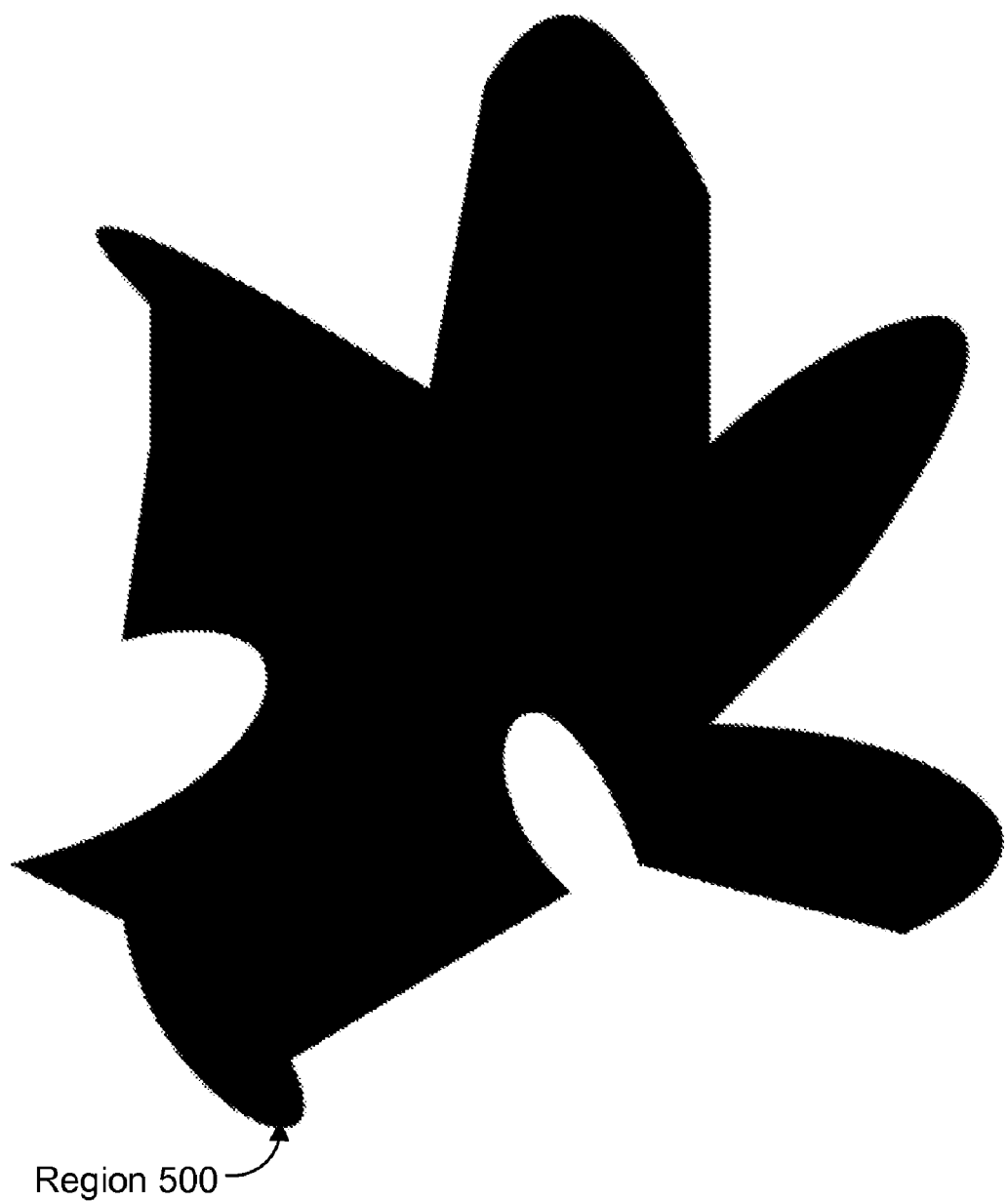
FIG. 5 is a diagram illustrating an example of a region defined by a path according to one embodiment.
Figure 6:
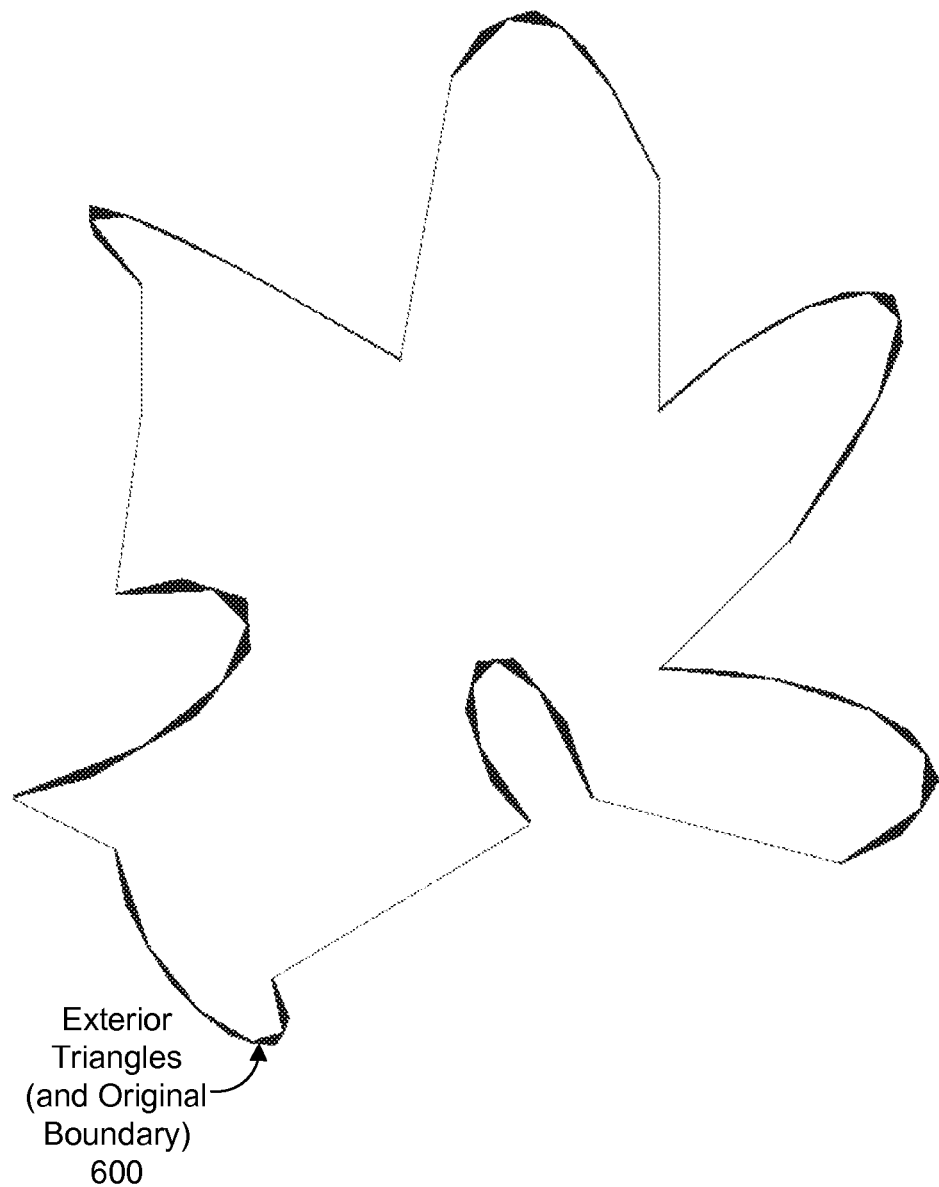
FIG. 6 is a diagram illustrating an example set of exterior triangles generated according to one embodiment.
Figure 7:
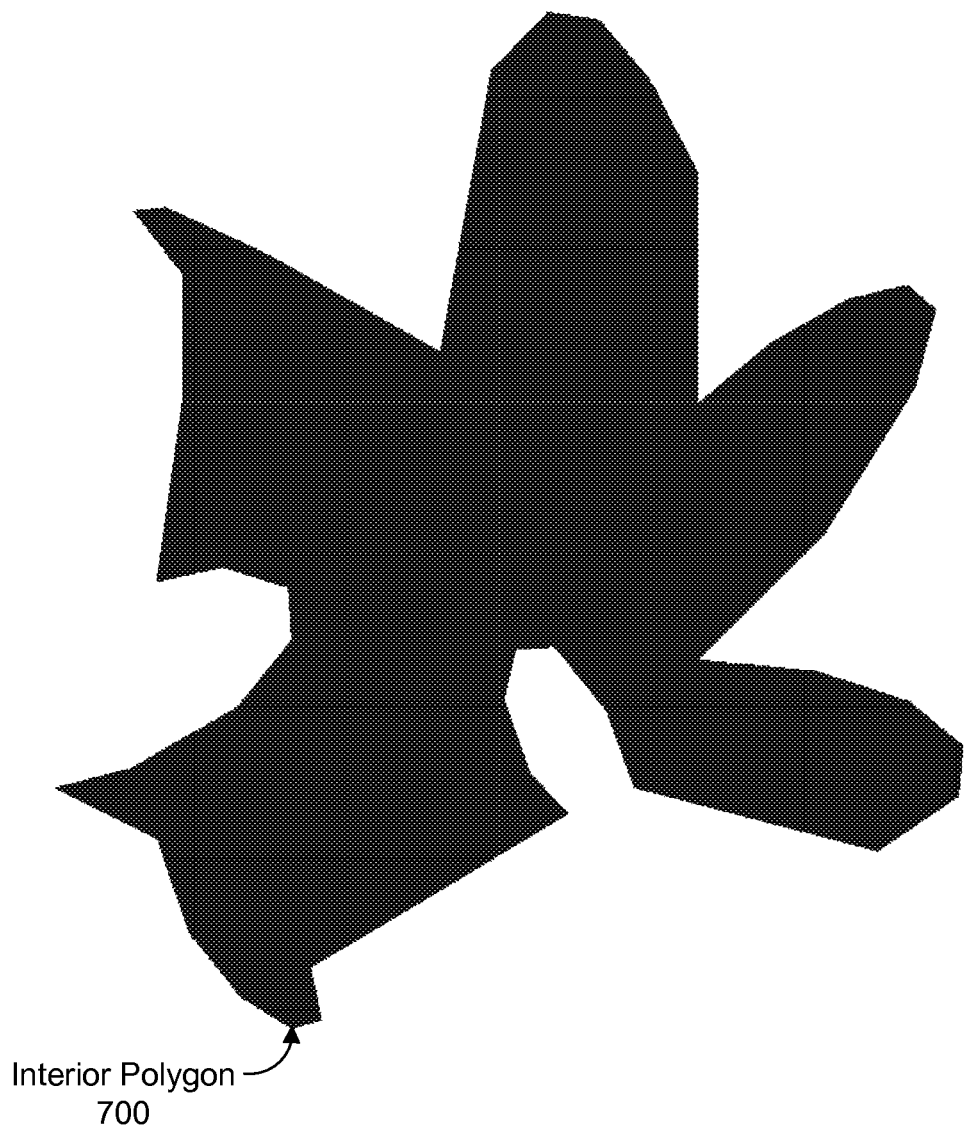
FIG. 7 is a diagram illustrating an example of an interior polygon generated according to one embodiment.
Figure 8:
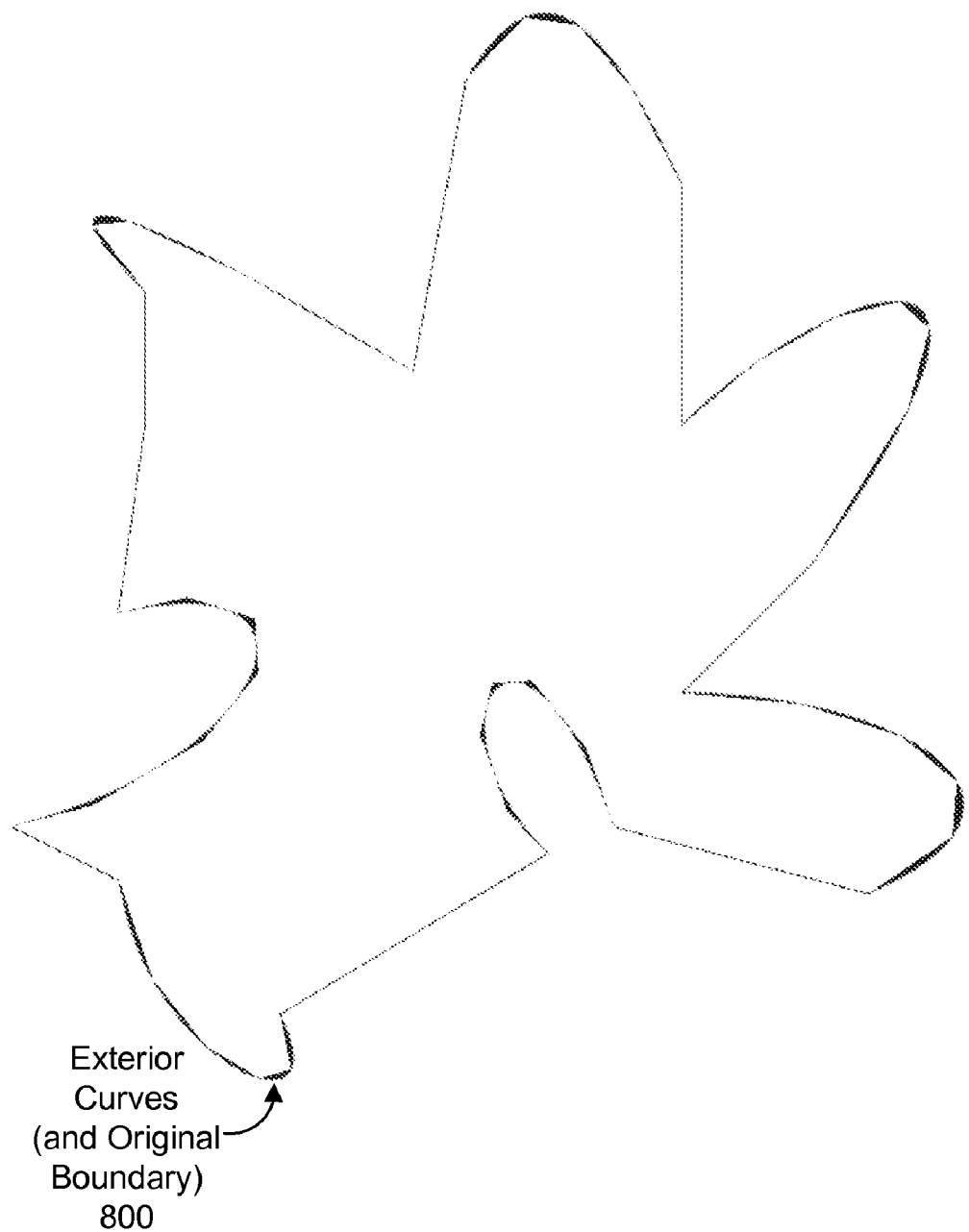
FIG. 8 is a diagram illustrating an example of curves in exterior triangles generated according to one embodiment.

An exemplary application of the techniques discussed above is illustrated in FIGS. 5, 6, 7, and 8. FIG. 5 is a diagram illustrating an example of a region 500 defined by a path according to one embodiment. The path includes a plurality of curve segments and a plurality of line segments. FIGS. 6, 7, and 8 are diagrams further illustrating the example region 500 according to one embodiment. In FIG. 6, the exterior triangles 600 are shown. For clarity, the boundary of the region is also shown in addition to the exterior triangles 600 representing curves. The exterior triangles may be generated, for example, through the operation(s) shown in block 330. In FIG. 7, the interior polygon 700 is shown. The interior polygon 700 may be generated, for example, through the operations(s) shown in blocks 340 and 350. The interior polygon 700 may be flat-shaded using a "fill" operation. In FIG. 8, the exterior triangles are shown as being rendered as curves 800. For clarity, the boundary of the region is also shown in addition to the shaded curves 800. By tessellating the path as a set of exterior triangles 600 encapsulating exterior curves 800 and a set of interior triangles for the interior polygon 700, the number of triangles sent to the GPU 100 may be minimized.

FIG. 9 is a block diagram illustrating constituent elements of a computer system 900 that is configured to implement embodiments of the system and method for rendering artwork with classification of exterior and interior triangles. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows® from Microsoft Corporation, MacOS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a GPU such as the GPU 100 illustrated in FIG. 1. Additionally, the computer system 900 may include one or more imaging devices 952. The one or more imaging devices 952 may include various types of raster-based imaging devices such as monitors and printers. In one embodiment, one or more display devices 952 may be coupled to the graphics component 956 for display of data provided by the graphics component 956.

In one embodiment, program instructions 940 that may be executable by the processor(s) 910 to implement aspects of the triangle classification and rendering techniques described herein may be partly or fully resident within the memory 920 at the computer system 900 at any point in time. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 9, as illustrated by the ellipsis shown.

In various embodiments, the elements shown in FIGS. 2 and 3 may be performed in a different order than the illustrated order. In FIGS. 2 and 3 any of the operations described in the elements may be performed programmatically (i.e., by a computer according to a computer program). In FIGS. 2 and 3 any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
generating a tessellation based on a path, wherein the tessellation comprises a plurality of triangles;
determining that a first subset of the plurality of triangles comprises one or more exterior triangles, wherein each of the one or more exterior triangles contains a respective curve, and wherein each of the one or more exterior triangles is defined by one or more vertices and one or more control points of the respective curve;
determining a side of the curve to be rendered for each respective triangle of the one or more exterior triangles;
determining that a second subset of the plurality of triangles comprises one or more interior triangles, wherein the one or more interior triangles comprise an interior polygon; and
rendering the exterior triangles and the interior triangles using a graphics processing unit (GPU), wherein each of the exterior triangles is rendered based on the respective side of the curve determined to be rendered.

2. The method as recited in claim 1, further comprising:
determining an orientation of the path; and
determining a respective orientation of each of the exterior triangles in relation to the orientation of the path;
wherein determining the side of the curve to be rendered for each respective triangle of the one or more exterior triangles is based on the respective orientation of each of the exterior triangles in relation to the orientation of the path.

3. The method as recited in claim 2, wherein determining the respective orientation of each of the exterior triangles in relation to the orientation of the path comprises determining whether each of the exterior triangles is concave or convex.

4. The method as recited in claim 3, wherein determining the side of the curve to be rendered for each respective triangle of the one or more exterior triangles comprises designating a region above the curve to be rendered for each concave triangle and designating a region below the curve to be rendered for each convex triangle.

5. The method as recited in claim 3, wherein each of the exterior triangles comprises two respective endpoints and a respective off-curve control point, and wherein the interior polygon comprises the endpoints for each of the exterior triangles and the respective off-curve control point for each of the exterior triangles determined to be concave.

6. The method as recited in claim 1, further comprising:
sending to the GPU the exterior triangles, the interior triangles, and a designation of the side of the curve to be rendered for each respective triangle of the one or more exterior triangles.

7. A computer-readable storage medium, comprising program instructions, wherein the program instructions are computer-executable to implement:
generating a tessellation based on a path, wherein the tessellation comprises a plurality of triangles;
determining that a first subset of the plurality of triangles comprises one or more exterior triangles, wherein each of the one or more exterior triangles contains a respective curve, and wherein each of the one or more exterior triangles is defined by one or more vertices and one or more control points of the respective curve;
determining a side of the curve to be rendered for each respective triangle of the one or more exterior triangles;
determining that a second subset of the plurality of triangles comprises one or more interior triangles, wherein the one or more interior triangles comprise an interior polygon; and
rendering the exterior triangles and the interior triangles using a graphics processing unit (GPU), wherein each of the exterior triangles is rendered based on the respective side of the curve determined to be rendered.

8. The computer-readable storage medium as recited in claim 7, wherein the program instructions are computer-executable to implement:
determining an orientation of the path; and
determining a respective orientation of each of the exterior triangles in relation to the orientation of the path;
wherein determining the side of the curve to be rendered for each respective triangle of the one or more exterior triangles is based on the respective orientation of each of the exterior triangles in relation to the orientation of the path.

9. The computer-readable storage medium as recited in claim 8, wherein determining the respective orientation of each of the exterior triangles in relation to the orientation of the path comprises determining whether each of the exterior triangles is concave or convex.

10. The computer-readable storage medium as recited in claim 9, wherein determining the side of the curve to be rendered for each respective triangle of the one or more exterior triangles comprises designating a region above the curve to be rendered for each concave triangle and designating a region below the curve to be rendered for each convex triangle.

11. The computer-readable storage medium as recited in claim 9, wherein each of the exterior triangles comprises two respective endpoints and a respective off-curve control point, and wherein the interior polygon comprises the endpoints for each of the exterior triangles and the respective off-curve control point for each of the exterior triangles determined to be concave.

12. The computer-readable storage medium as recited in claim 7, wherein the program instructions are computer-executable to implement:

sending to the GPU the exterior triangles, the interior triangles, and a designation of the side of the curve to be rendered for each respective triangle of the one or more exterior triangles.

13. A system, comprising:

at least one processor;

a memory coupled to the at least one processor, wherein the memory is configured to store program instructions executable by the at least one processor to:

generate a tessellation based on a path, wherein the tessellation comprises a plurality of triangles;

determine that a first subset of the plurality of triangles comprises one or more exterior triangles, wherein each of the one or more exterior triangles contains a respective curve, and wherein each of the one or more exterior triangles is defined by one or more vertices and one or more control points of the respective curve;

determine a side of the curve to be rendered for each respective triangle of the one or more exterior triangles;

determine that a second subset of the plurality of triangles comprises one or more interior triangles, wherein the one or more interior triangles comprise an interior polygon; and a graphics processing unit (GPU) coupled to the at least one processor, wherein the GPU is executable to render the exterior triangles and the interior triangles, wherein each of the exterior triangles is rendered based on the respective side of the curve determined to be rendered.

14. The system as recited in claim 13, wherein the program instructions are executable by the at least one processor to:

determine an orientation of the path; and determine a respective orientation of each of the exterior triangles in relation to the orientation of the path;

wherein determining the side of the curve to be rendered for each respective triangle of the one or more exterior triangles is based on the respective orientation of each of the exterior triangles in relation to the orientation of the path.

15. The system as recited in claim 14, wherein, in determining the respective orientation of each of the exterior triangles in relation to the orientation of the path, the program instructions are executable by the at least one processor to determine whether each of the exterior triangles is concave or convex.

16. The system as recited in claim 15, wherein, in determining the side of the curve to be rendered for each respective triangle of the one or more exterior triangles, the program instructions are executable by the at least one processor to designate a region above the curve to be rendered for each concave triangle and designate a region below the curve to be rendered for each convex triangle.

17. The system as recited in claim 15, wherein each of the exterior triangles comprises two respective endpoints and a respective off-curve control point, and wherein the interior polygon comprises the endpoints for each of the exterior triangles and the respective off-curve control point for each of the exterior triangles determined to be concave.

18. The system as recited in claim 13, wherein the program instructions are executable by the at least one processor to:

send to the GPU the exterior triangles, the interior triangles, and a designation of the side of the curve to be rendered for each respective triangle of the one or more exterior triangles.

\* \* \* \* \*